Sept. 29, 1959 E. SCHRACK 2,906,927
CONTROL CIRCUIT FOR MAGNETIC SWITCH
Original Filed Dec. 17, 1953
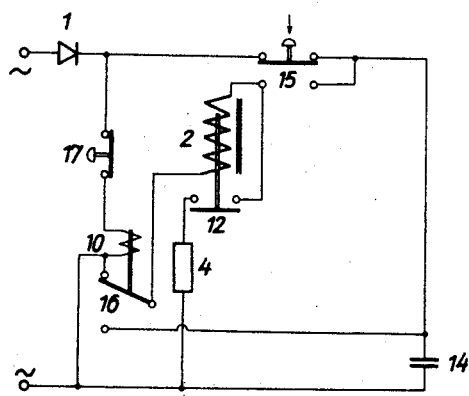
INVENTOR
*Eduard Schrack,*
BY
*Henry W. Bock*
AGENT

United States Patent Office 2,906,927
Patented Sept. 29, 1959

2,906,927

CONTROL CIRCUIT FOR MAGNETIC SWITCH

Eduard Schrack, Vienna, Austria

Original application December 17, 1953, Serial No. 398,814. Divided and this application February 12, 1957, Serial No. 639,817

Claims priority, application Austria November 6, 1953

3 Claims. (Cl. 317—151)

This application is a division of my copending application, Serial Number 398,814, dated December 17, 1953, now abandoned.

This invention relates to a control circuit for a magnetic switch having a magnetic circuit which consists at least partly of ferromagnetic material, and a coil constituting the load of said control circuit and inductivity coupled to said magnetic circuit and energizable to change the magnetic condition thereof, more particularly to control circuits of this type which comprise two loops connectable to said load for driving the same.

In switches of the type described, the laminated core, preferably also the armature of the magnet possess high magnetic remanence. For closing the switch, magnetization is effected by a current impulse and after the interruption of the exciting current the armature is held by the residual flux of the magnetic circuit alone so that the switch remains closed. The armature is released and the switch opened only by another suitably weaker current impulse, opposite to the first one and affecting demagnetization. This operation as such is independent of the type of current used so that direct or alternating current may be employed for the magnetizing and demagnetizing impulses.

In switches thus constructed the exciting circuit is independent of variations, fluctuations or a drop of the feed voltage when the switch is closed so that the switch remains closed until it is opened intentionally. Thus the switch remains closed even if the current fails unexpectedly, and when the current reappears the circuit connected is energized again. This may cause the start of machines connected to such circuit at an uncontrolled time, with considerable danger to operators, machines and work.

It is an object of the invention to provide a switch of the type described, which ensures an automatic demagnetization of the magnet even when the exciting voltage fails unintendedly. In this connection, the special difficulty must be overcome which resides in the fact that when the feed voltage fails the power required for demagnetization cannot be supplied to the exciting circuit from the outside, but must be generated in the switch itself, where a source of power must be provided which responds automatically just to a failure of the voltage applied thereto.

The invention thus requires in any case that the energy required for the opening impulse, i.e. for demagnetizing the magnet, be stored in the switch itself, whereas the same measure may be or may not be adopted for the magnetizing impulse.

Suitable storage means may comprise according to the invention, capacitors or transformers having a soft-iron core, in corresponding networks. The exciting circuit must be fed through a rectifier. As will be explained hereinafter this is of advantage not only for alternating current, but also for direct current operation. Where the magnetizing energy and demagnetizing energy are stored two separate capacitors or a common capacitor may be employed.

For this reason two basic types are contemplated for the design of the circuit according to the inventions: Circuits with impulse capacitors, and circuits with impulse transformers. Several variations are possible for each type. Therefore, it is another and more specific object of the invention to provide in a control circuit of the type described a combination of means for driving said load through said first loop and responsive to a voltage drop by driving said load through said second loop.

The energy storage means may comprise a capacitor connectable in series with said load, and the discharging circuit means may comprise a resistor connectable in series with said capacitor.

The circuit may comprise a source of voltage and a voltage-drop relay connected across said source, for purposes to be set forth hereinafter.

The control contact may consist of a manually operable change-over contact normally connecting the capacitor in series with a rectifier across the source of voltage and operable to connect said capacitor in circuit with said load, and said discharging circuit means may be operable to connect said capacitor in said second loop to said load with a polarity opposite to that obtained by the operation of said manually operable change-over contact, and comprise a normally open contact operatively connected to said magnetic circuit and operable thereby upon the response of said magnetic circuit to connection of said load to said capacitor through said manually operable change-over contact. In this arrangement the change-over relay contact normally connects said capacitor in said second loop with said load in series with said normally open contact and is operatively connected to said relay to be held thereby, when a predetermined minimum voltage is applied thereto, in series between said capacitor and load to prepare the connection to be closed by the operation of said manually operable change-over contact, whereas said change-over relay contact is releasable by said relay when said voltage drops below said minimum.

From what has been said hereinbefore, the considerable advantages of switches according to the invention have become apparent already. They reside more particularly in the fact that the exciting coil does not carry current after the switch has been closed so that when the switch is closed no power is consumed in the exciting circuit and the most disturbing hum is avoided which was inevitable in the known A.C. electromagnetic relays or switches. Moreover, the storage of the energy for the demagnetizing impulse in a special storage means according to the invention ensures a perfect solution to the problem set forth hereinbefore, to open the switch reliably when the exciting voltage fails or drops. It has also been shown that special networks may be provided in which the shunt path, required for the discharge of the storage means for opening the switch, is interrupted in the closed condition of the switch so that even the small power consumption by the current flow through the discharge resister is eliminated. Further, the magnetizing impulse too may be taken from an impulse capacitor, which is preferably used for magnetizing as well as demagnetizing the switch. In that case the relatively large rectifier otherwise required for the transmission of the strong closing impulse taken directly from the feed voltage may be replaced by a smaller one.

Further features and details of the invention will be described with reference to the basic wiring diagrams and embodiment illustrated in the drawing.

The figure is a control circuit with a common impulse capacitor for opening and closing the switch.

The figure illustrates a preferred embodiment of a control circuit with only one impulse capacitor 14 used for magnetizing and demagnetizing the switch. That capacitor has the feed voltage constantly applied thereto and is connected for magnetization by the change-over contact 15 to the exciting circuit 14—15—2—14, and for demagnetization by the change-over contact 16 to the discharge circuit 14—16—2—12—4—14, which is interrupted automatically during the magnetizing operation by the auxiliary contact 12. The change-over contact 16 for demagnetizing is suitably operated by a voltage-drop relay 10 which is connected to the mains and has connected in its supply conductor also the demagnetizing contact 17.

Whereas one embodiment of the invention has been described hereinbefore with reference to the application of the control circuit to switches of the contactor type, it is apparent that the operation of the circuit is independent of the type of the load and of the type of switch controlled since numerous other applications of the novel circuit within the scope of the appended claims will be obvious to men skilled in the art to which this invention pertains. More particularly, the switch controlled by the circuit may be a relay, an overloaded switch, or the like, instead of a contactor.

I claim:

1. In a residual stick type magnet switching device, the combination comprising a source of A.C. power, a single condenser and a rectifier, said condenser charged through said rectifier by said source, a coil having a residual stick type magnet core, change-over contact means operable for connecting one terminal of the charged condenser to one pole of the coil in parallel relation to magnetize the core, second change-over contact means in one position connecting the other coil pole to the second terminal of the condenser and in another position connecting said other coil pole to the first condenser terminal, a shunt connecting said one coil pole to the second condenser terminal, an auxiliary break contact in the shunt closed upon magnetization and opened upon demagnetization of the core, a resistance in the shunt between the auxiliary break-contact and condenser, whereby the discharge of the condenser in the same direction magnetizes and demagnetizes the core, and a low-voltage relay having a coil connected through an off-button across the power supply line and operating the second change-over contact means on the drop of the voltage below a predetermined minimum to complete the demagnetizing circuit open during magnetization.

2. In a residual stick type magnet switching device, the combination comprising a source of A.C. power, a single condenser charged through a rectifier by the source, a coil having a residual stick type magnet core, change-over contact means operable for connecting one terminal of the charged condenser to one pole of the coil in parallel relation to magnetize the core, second change-over contact means in one position connecting the other pole of the coil to the other terminal of the condenser and in another position connecting the other coil pole to the first condenser terminal, a shunt circuit connecting the first pole of the coil over an auxiliary break contact and a resistor to the second condenser terminal, the break contact being closed after magnetization and opened after demagnetization of the coil core, whereby operating the first change-over contact means causes magnetization of the core due to condenser discharge in one direction, and operating the second change-over contact means causes demagnetization of the core due to condenser discharge in opposite direction and at reduced intensity.

3. In a residual stick type magnet switching device, the combination comprising a source of A.C. power, a single condenser charged through a rectifier by the source, a coil having a residual stick type magnet core, change-over contact means operable for connecting one terminal of the charged condenser to one pole of the coil in parallel relation to magnetize the core, second change-over contact means in one position connecting the other coil pole to the second terminal of the condenser and in another position connecting the said other coil pole to the first condenser terminal, a shunt circuit connecting the said one coil pole to the second condenser terminal over an auxiliary break contact and a resistor, the break contact being closed after magnetization and opened after demagnetization of the coil core, whereby operation of the first change-over contact means causes magnetization of the core due to condenser discharge in one direction; a low-voltage relay having a coil connected through an off-button across the power supply line and operating the second change-over contact either on voltage drop below a predetermined minimum or on opening the off-button and thereby demagnetizing the core due to condenser discharge in the opposite direction and at reduced intensity.

References Cited in the file of this patent

UNITED STATES PATENTS

| | | |
|---|---|---|
| 2,504,996 | MacDonald | Apr. 25, 1950 |
| 2,764,715 | Lorenz | Sept. 25, 1956 |

FOREIGN PATENTS

| | | |
|---|---|---|
| 667,479 | Germany | Nov. 12, 1938 |
| 844,194 | Germany | July 17, 1952 |